(12) United States Patent
Fitzpatrick

(10) Patent No.: US 9,939,811 B1
(45) Date of Patent: Apr. 10, 2018

(54) REMOTE CONTROLLED INFANT STROLLER WITH A CHANGING TABLE

(71) Applicant: Eyria Fitzpatrick, Shorter, AL (US)

(72) Inventor: Eyria Fitzpatrick, Shorter, AL (US)

( * ) Notice: Subject to any disclaimer, the term of this patent is extended or adjusted under 35 U.S.C. 154(b) by 0 days.

(21) Appl. No.: 15/049,984

(22) Filed: Feb. 22, 2016

(51) Int. Cl.
| | |
|---|---|
| G05D 1/00 | (2006.01) |
| G01S 19/17 | (2010.01) |
| B62B 7/04 | (2006.01) |
| B62B 9/08 | (2006.01) |
| B62B 9/12 | (2006.01) |

(52) U.S. Cl.
CPC .............. *G05D 1/0055* (2013.01); *B62B 7/04* (2013.01); *B62B 9/08* (2013.01); *B62B 9/12* (2013.01); *G01S 19/17* (2013.01); *G05D 1/0016* (2013.01)

(58) Field of Classification Search
CPC .. B62B 7/04; B62B 9/08; A47D 13/00; G06F 19/00
See application file for complete search history.

(56) References Cited

U.S. PATENT DOCUMENTS

| | | | | |
|---|---|---|---|---|
| 5,772,235 | A * | 6/1998 | Espenshade | B62B 7/123 |
| | | | | 280/643 |
| 7,036,699 | B1 | 5/2006 | Hay et al. | |
| 7,198,122 | B1 | 4/2007 | Smith | |
| 7,273,225 | B2 | 9/2007 | Yeh | |
| 8,256,793 | B1 * | 9/2012 | Krieger | A63H 33/006 |
| | | | | 280/647 |
| 8,480,114 | B1 * | 7/2013 | Grantz | A47D 5/006 |
| | | | | 280/642 |
| 8,936,254 | B2 * | 1/2015 | Viana | B60N 2/2848 |
| | | | | 280/30 |
| 2003/0204933 | A1 | 11/2003 | Yeh | |
| 2007/0170674 | A1 * | 7/2007 | Chuah | A47D 5/006 |
| | | | | 280/47.38 |
| 2008/0258516 | A1 * | 10/2008 | Meeker | A47D 13/02 |
| | | | | 297/183.1 |
| 2011/0010024 | A1 * | 1/2011 | Salisbury | G06F 3/014 |
| | | | | 701/2 |
| 2011/0232000 | A1 * | 9/2011 | Rodriguez | A47D 5/006 |
| | | | | 5/655 |
| 2011/0270679 | A1 * | 11/2011 | Tziortzis | G06Q 30/02 |
| | | | | 705/14.58 |
| 2012/0029917 | A1 * | 2/2012 | Chang | H04L 12/588 |
| | | | | 704/235 |
| 2013/0131930 | A1 | 5/2013 | Kwong | |
| 2013/0213749 | A1 | 8/2013 | Li et al. | |
| 2015/0262134 | A1 * | 9/2015 | Daley | G06Q 50/265 |
| | | | | 705/305 |
| 2015/0296998 | A1 * | 10/2015 | Wyler | A47D 5/00 |
| | | | | 5/655 |

FOREIGN PATENT DOCUMENTS

CN      203158052 U      8/2013

* cited by examiner

*Primary Examiner* — Alex C Dunn

(74) *Attorney, Agent, or Firm* — Stevenson IP, LLC

(57) ABSTRACT

A wheeled remote controlled infant stroller with a changing table including a changing table platform having telescopic foldable legs and being pivotably attached to a rear end of a support frame of an infant stroller body with the changing table platform pivoting outwardly away from a rear side of the infant stroller body. Also included is a remote-controlled braking system to wirelessly control the wheels and GPS tracking capabilities.

4 Claims, 5 Drawing Sheets

US 9,939,811 B1

REMOTE CONTROLLED INFANT STROLLER WITH A CHANGING TABLE

BACKGROUND OF THE INVENTION

Various types of infant strollers are known in the prior art. However, what is needed is a remote controlled infant stroller with an outwardly foldable changing table having telescopic legs, a remote-controlled braking system, and global positioning system, hereinafter "GPS", capabilities for tracking the infant stroller.

FIELD OF THE INVENTION

The present invention relates to infant strollers, and more particularly, to a remote controlled infant stroller with a changing table.

SUMMARY OF THE INVENTION

The general purpose of the present remote controlled infant stroller with a changing table, described subsequently in greater detail, is to provide a remote controlled infant stroller with a changing table which has many novel features that result in a remote controlled infant stroller with a changing table which is not anticipated, rendered obvious, suggested, or even implied by prior art, either alone or in combination thereof.

To accomplish this, the present remote controlled infant stroller with a changing table is devised to provide a sanitary place to change diapers. The present device is also provides wireless wheel control as well as GPS capabilities for tracking. The infant stroller body has a support frame with a wheelbase attached thereto and has a section vertically disposed along a rear side of the infant stroller body directly adjacent each of a right side and a left side thereof and extending beyond a top perimeter of the infant stroller body. A pair of pivot arms is attached to the support frame proximal the top perimeter and on the respective right and left sides. A solid monolithic changing table platform folds outwardly from the support frame away from the rear side of the infant stroller body. Each of a right end and a left end of the platform proximal the rear end is pivotally attached to the respective pivot arm. A pair of telescopic legs supports the changing table platform during use to change an infant's diaper and folds up against a bottom surface of the platform to which the legs are secured with first securing clips secure the legs against the changing table platform.

A voice-activated remote-controlled braking system is attached to the wheels and is in operational communication with each of a wireless combined remote control transmitter and GPS transmitter and a rechargeable battery pack attached to the infant stroller body. The braking system and the wireless combined remote control transmitter and GPS transmitter control the activation and alternate deactivation of a rotation of the plurality of wheels. The braking system enables a caregiver to go for a walk or run while keeping an infant in the infant stroller body in close proximity, but without having to directly hold onto the infant stroller body to control the movement of the infant stroller body, and also controls the movement of the stroller in the event of an emergency. A global positioning receiver disposed on the infant stroller body and in operational communication with the wireless combined remote control transmitter and GPS transmitter provides a current location of the infant stroller body.

A zippered cover is provided to maintain the changing table platform in a clean condition and to protect the changing table platform against deterioration. A pair of second securing clips is provided to secure the changing table platform to the support frame. A storage compartment is continuously disposed between the bottom side of the infant stroller body and the plurality of wheels.

Thus has been broadly outlined the more important features of the present remote controlled infant stroller with a changing table so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
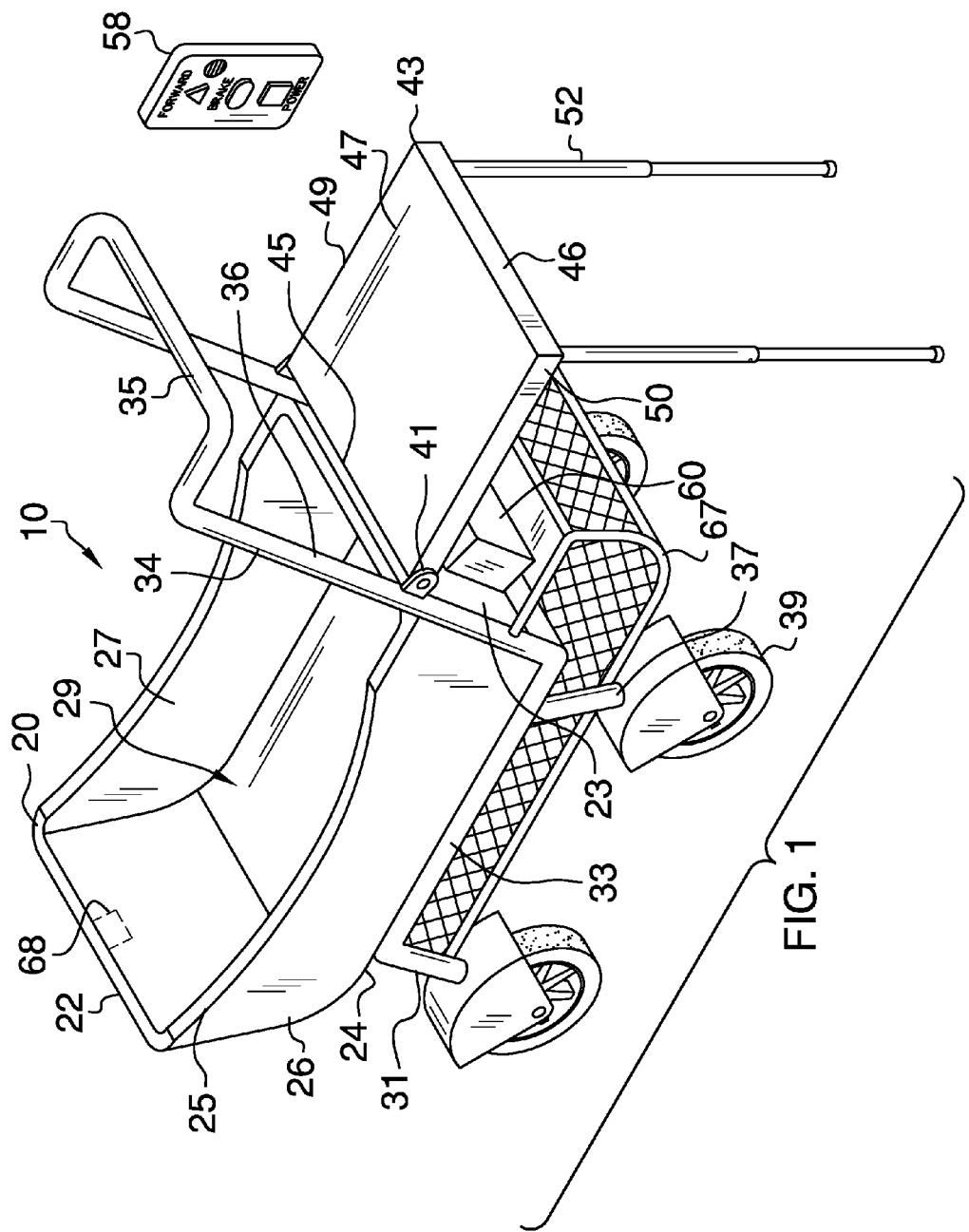
FIG. 1 is a perspective view illustrating an infant stroller body and a separate remote control transmitter with a changing table platform pivotably attached to a handle of the stroller and shown in an extended condition.
Figure 2:
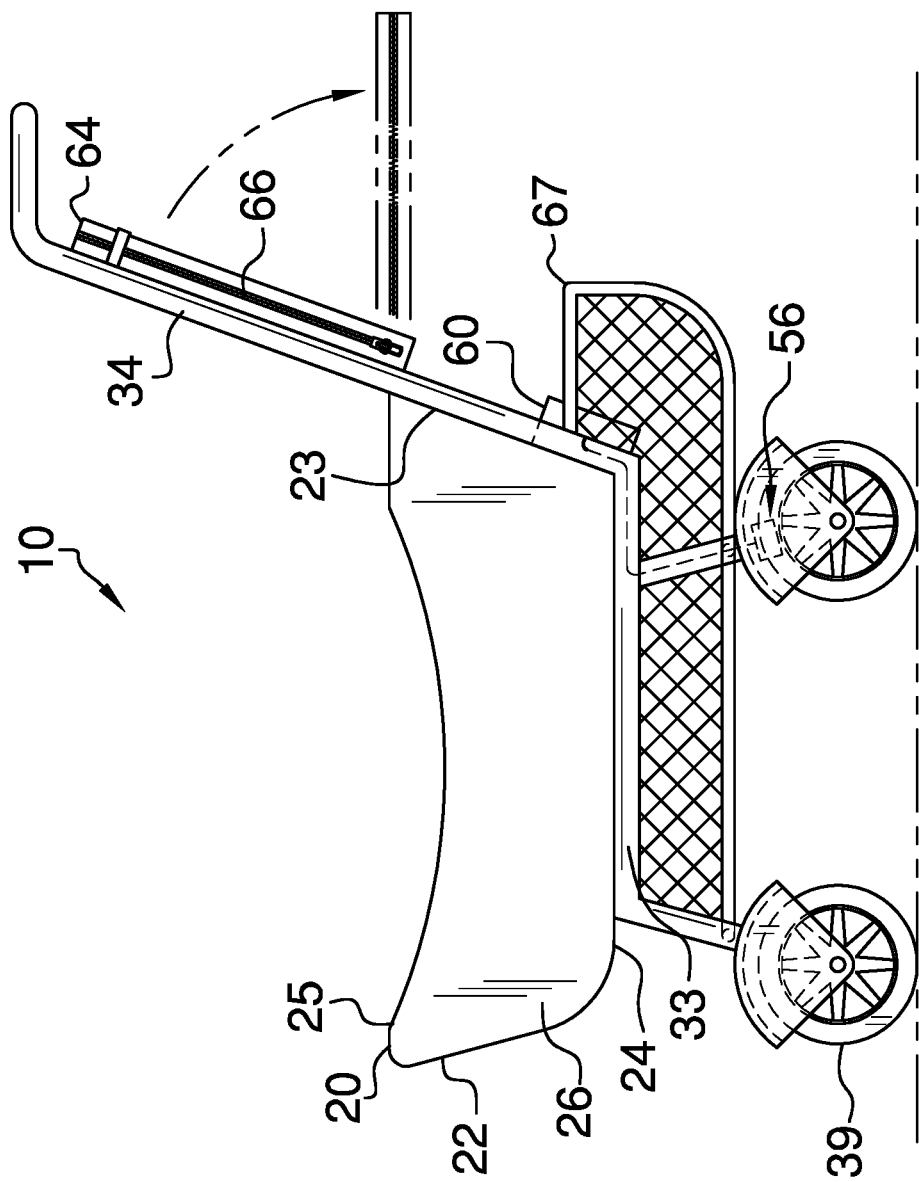
FIG. 2 is a side elevation view showing the extendability of the changing table platform from a retracted condition to the extended condition.
Figure 3:
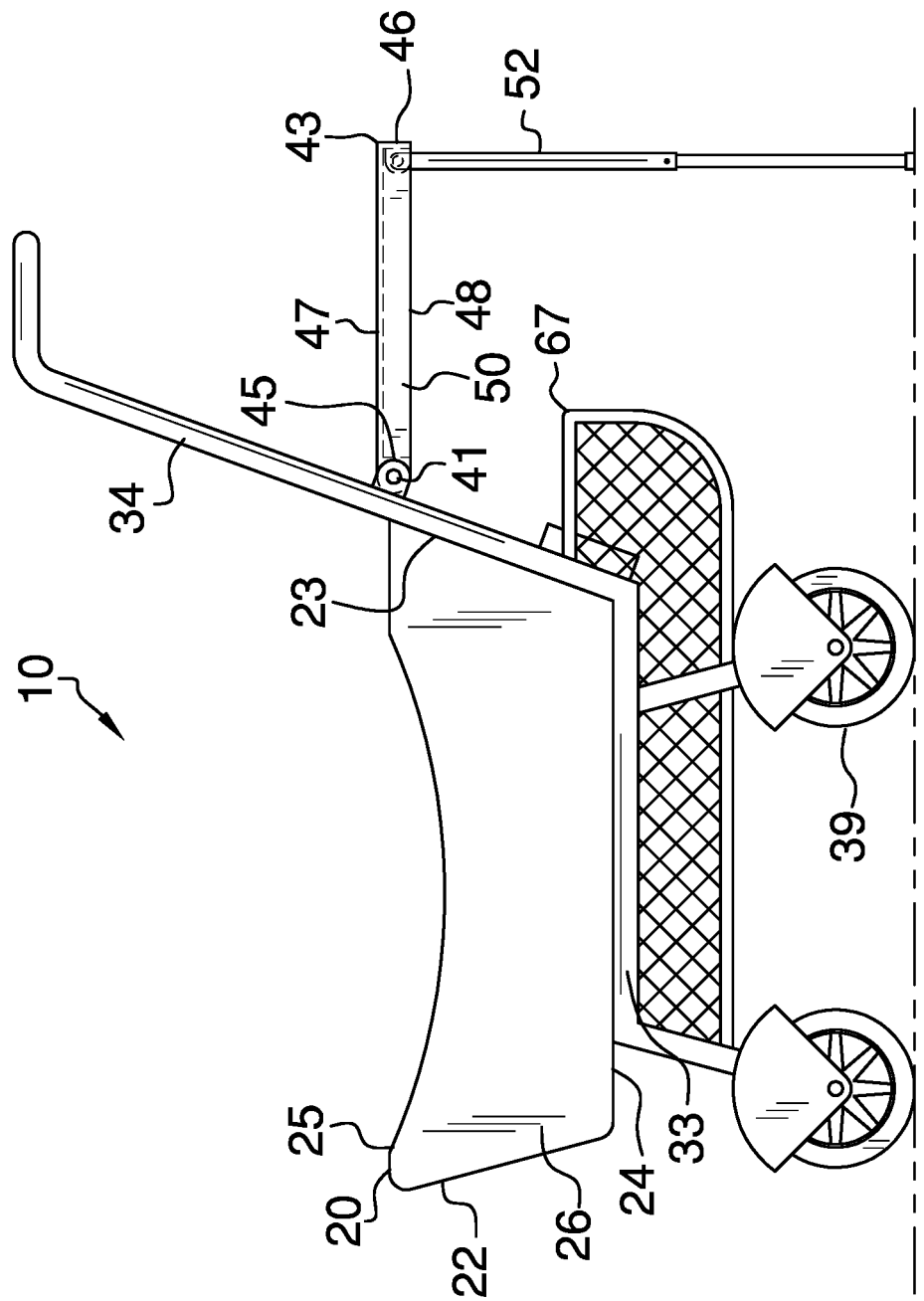
FIG. 3 is a side elevation view illustrating the changing table platform in the extended condition.
Figure 4:
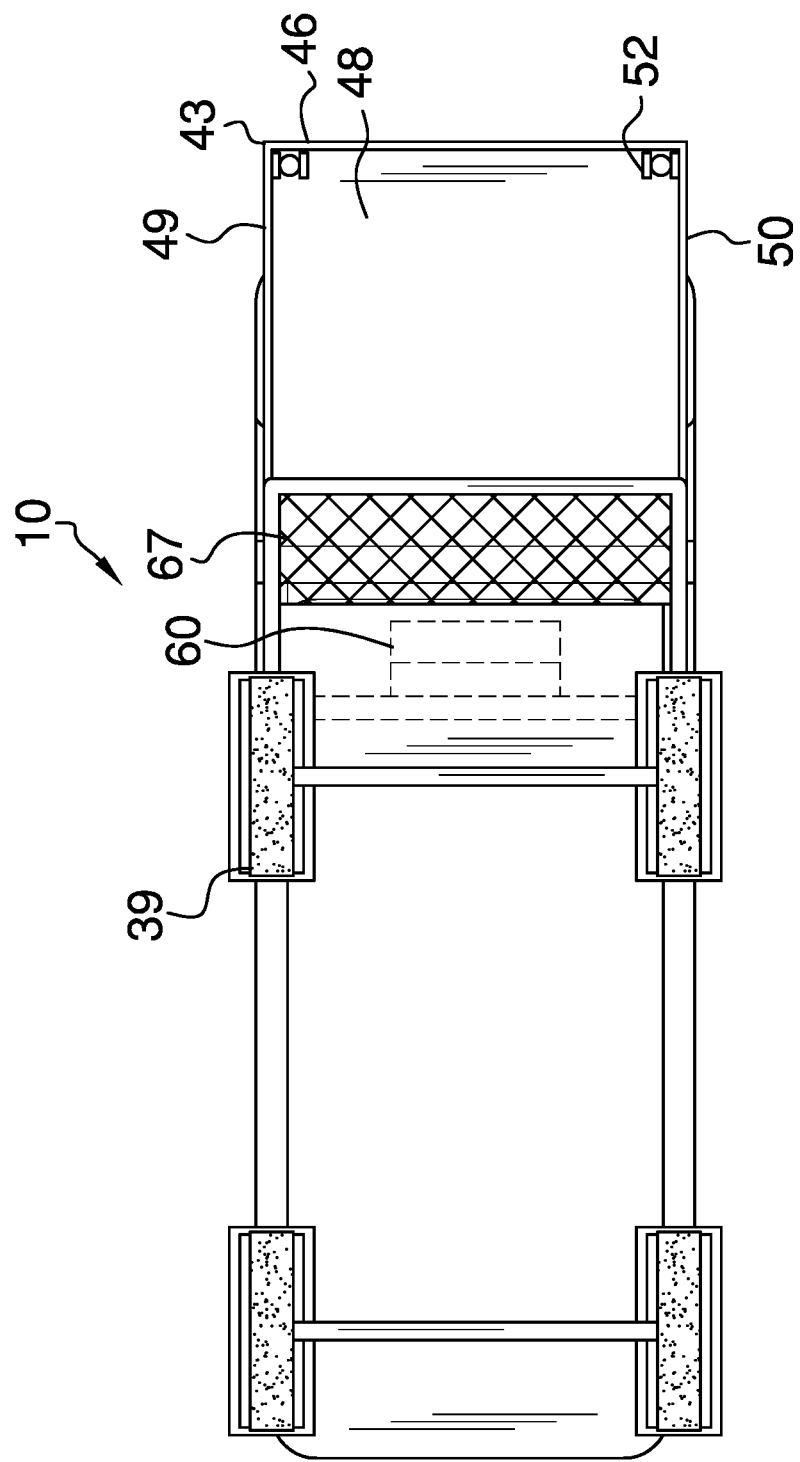
FIG. 4 is a bottom plan view of the infant stroller body illustrating the changing table platform in the extended condition.
Figure 5:
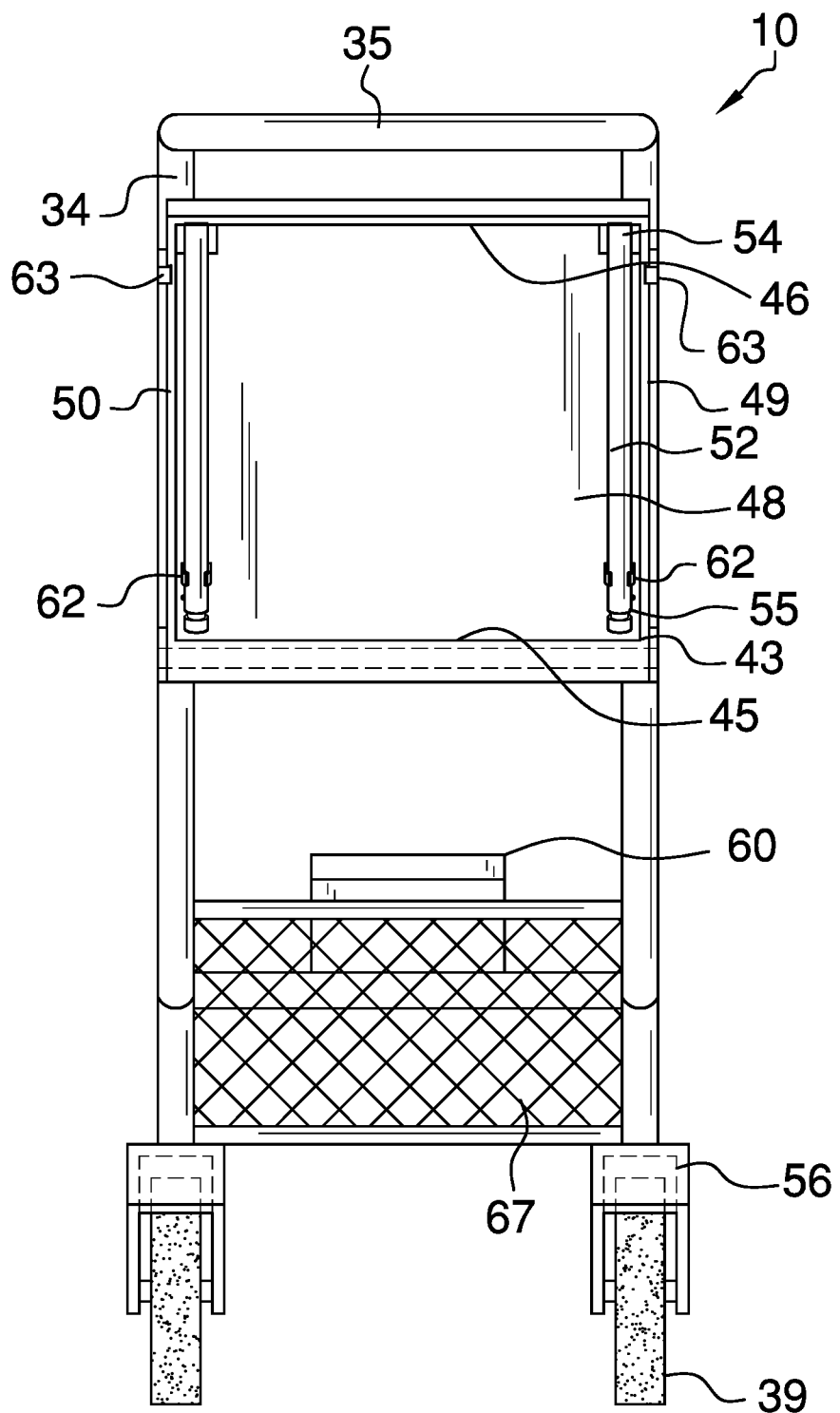
FIG. 5 is a rear elevation view of the infant stroller body with the changing table platform in the retracted condition.

With reference now to the drawings, and in particular FIGS. 1 through 5 thereof, an example of the instant remote controlled infant stroller with a changing table employing the principles and concepts of the present remote controlled infant stroller with a changing table and generally designated by the reference number 10 will be described.

Referring to FIGS. 1 through 5, the present remote controlled infant stroller with a changing table 10 is illustrated. The remote controlled infant stroller with a changing table 10 includes an infant stroller body 20. The infant stroller body 20 has a front side 22, a rear side 23, a bottom side 24, a top perimeter 25, and a seating area 29 defined by the front side 22, the rear side 23, the bottom side 24, the top perimeter 25, the right side 26, and the left side 27. A support frame 31 is disposed on the infant stroller body 20.

The support frame 31 has a first section 33, a second section 34, and a handle section 35. The first section 33 is disposed on the bottom side 24 along each of substantially the entire right and left sides 26, 27. The second section 34 is vertically disposed from the first section 24 along the rear side 23 directly adjacent each of the right side 26 and the left side and extending beyond the top perimeter 25. The handle section 35 is disposed between the second section 34 on the right side 26 and the second section 34 on the left side 27 in a position substantially parallel to a portion of the top perimeter 25 along the rear side 23. The second section 34 has a back side 36.

A wheelbase 37 is directly attached to the support frame 31. The wheelbase 37 includes a plurality of wheels 39.

A pair of pivot arms 41 is attached to the support frame 31. One of the pivot arms 41 is attached to second section 34 of the support frame 31 proximal the top perimeter 25 and one of each of the right side 26 and the left side 27.

A solid monolithic changing table platform 43 folds outwardly from the support frame 31 away from the rear side 23 of the infant stroller body 20. The changing table platform 43 has a rear end 45, a front end 46, a top surface 47, a bottom surface 48, a right end 49, and a left end 50. Each of the right end 49 and the left end 50 proximal the rear end 45 is pivotally attached to the respective pivot arm 41. A pair of telescopic legs 52 supports the changing table platform 43 during use to change an infant's diaper. Each leg 52 has an upper end 54 and a lower end 55. The upper end 54 is foldably attached to the bottom surface 48 between the front end 46 and each of the right end 49 and the left end 50. Each of the telescopic legs 52 is extendible from a shortest length equal to a length of the respective right end 49 and left end 50 to a longest length equal to a length from the bottom surface 48 to a ground surface on which the plurality of wheels 39 is disposed. The legs 52 are configured to fold flat against the bottom surface 48 of the changing table platform 43 and the changing table platform 43 and the legs 52 are configured to fold flat against the support frame 31 second section 34 back side 36.

A pair of first securing clips 62 is provided to secure the legs against the changing table platform 43. One of the first securing clips 62 is disposed on the bottom surface 48 of the changing table platform 43 proximal the rear end 45 and each of the right end 49 and the left end 50. The lower end 55 of each leg 52 engages a respective one of the securing clips 62.

A voice-activated remote-controlled braking system 56 is attached to each of the plurality of wheels 39 and is in operational communication with each of a wireless combined remote control transmitter and GPS transmitter 58 and a rechargeable battery pack 60 attached to the infant stroller body 20. The braking system 56 and the wireless combined remote control transmitter and GPS transmitter 58 are configured to control the activation and alternate deactivation of a rotation of the plurality of wheels 39. The braking system 56 enables a caregiver to go for a walk or run while keeping an infant in the infant stroller body 20 in close proximity, but without having to directly hold onto the infant stroller body 20 to control the movement of the infant stroller body 20. A global positioning receiver 68 is disposed on the infant stroller body 20 and is in operational communication with the wireless combined remote control transmitter and GPS transmitter 58 to provide a current location of the infant stroller body 20.

A cover 64 is provided to maintain the changing table platform 43 in a clean condition and to protect the changing table platform 43 against deterioration due to environmental conditions which negatively impact the materials from which the cover 64 is made. The cover 64 is configured to surround the entire changing table platform 43 and has a zipper 66 centrally disposed along substantially the entire perimeter thereof to assist in inserting and storing the changing table platform 43 therein.

A pair of second securing clips 63 is provided to secure the changing table platform 43 to the support frame 31. One of the securing clips 63 is removably securable to the second section 34 and to the respective right end 49 and left end 50 of the changing table platform 43.

A storage compartment 67 is continuously disposed between the bottom side 24 of the infant stroller body 20 and the plurality of wheels 39. The storage compartment 67 extends from proximal the front side 22 and at least to the rear side 23.

What is claimed is:

1. A remote controlled infant stroller with a changing table comprising:
    an infant stroller body having a front side, a rear side, a bottom side, a top perimeter, and a seating area defined by the front side, the rear side, the bottom side, the top perimeter, the right side, and the left side;
    a support frame having a first section, a second section, and a handle section, the first section being disposed on the bottom side along each of substantially the entire right and left sides, the second section being vertically disposed from the first section along the rear side directly adjacent each of the right side and the left side and extending beyond the top perimeter, the handle section being disposed between the second section on the right side and the second section on the left side in a position substantially parallel to a portion of the top perimeter along the rear side, the second section having a back side;
    a wheelbase directly attached to the support frame, the wheelbase including a plurality of wheels;
    a pair of pivot arms, one of the pivot arms attached to second section of the support frame-proximal the top perimeter and one of each of the right side and the left side;
    a solid monolithic changing table platform having a rear end, a front end, a top surface, a bottom surface, a right end, and a left end, each of the right end and the left end proximal the rear end being pivotally attached to the respective pivot arm;
    a pair of telescopic legs, each leg having an upper end and a lower end, the upper end foldably attached to the bottom surface between the front end and each of the right end and the left end, wherein each of the telescopic legs is extendible from a shortest length equal to a length of the respective right end and left end to a longest length equal to a length from the bottom surface to a ground surface on which the plurality of wheels is disposed, wherein the legs are configured to fold flat against the bottom surface of the changing table platform and the changing table platform and the legs are configured to fold flat against the support frame second section back side;
    a pair of first securing clips, one of the first securing clips disposed on the bottom surface of the changing table platform proximal the rear end and each of the right end and the left end, wherein the lower end of each leg engages a respective one of the securing clips; and
    a voice-activated remote-controlled braking system attached to each of the plurality of wheels and in operational communication with each of a wireless combined remote control transmitter and GPS transmitter and a rechargeable battery pack attached to the infant stroller body, wherein the braking system and the wireless combined remote control transmitter and GPS transmitter are configured to control the activation and alternate deactivation of a rotation of the plurality of wheels.

2. The remote controlled infant stroller with a changing table of claim 1 comprising:
    a cover configured to surround the entire changing table platform, the cover having a zipper centrally disposed along substantially the entire perimeter thereof; and
    a pair of second securing clips, one of the securing clips removably securable to the second section and to the respective right end and left end of the changing table platform.

3. The remote controlled infant stroller with a changing table of claim 1 comprising:
  a storage compartment continuously disposed between the bottom side of the infant stroller body and the plurality of wheels, the storage compartment extending from proximal the front side and at least to the rear side.

4. The remote controlled infant stroller with a changing table of claim 1 comprising:
  a global positioning receiver disposed on the infant stroller body, the global positioning receiver being in operational communication with the wireless combined remote control transmitter and GPS transmitter and being configured to provide a current location of the infant stroller body.

\* \* \* \* \*